April 21, 1953 W. P. OEHLER ET AL 2,635,522
DISK HARROW AND SCRAPER CONTROL MECHANISM
Original Filed Sept. 15, 1947
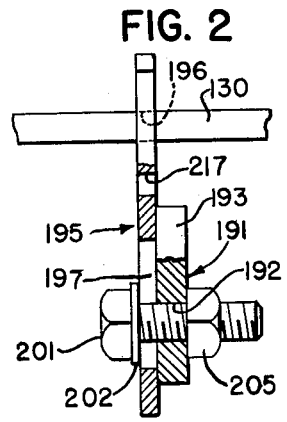
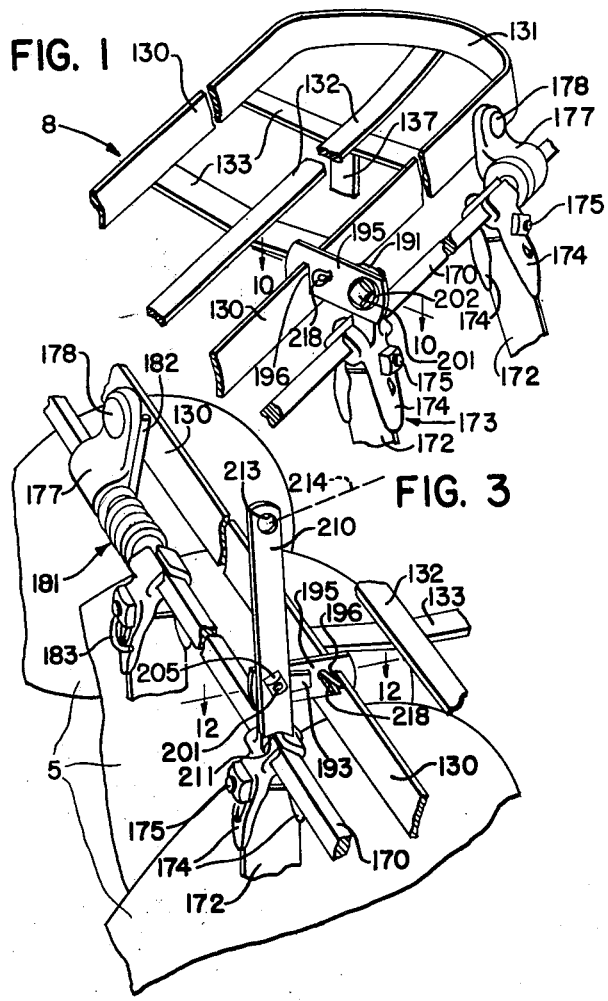
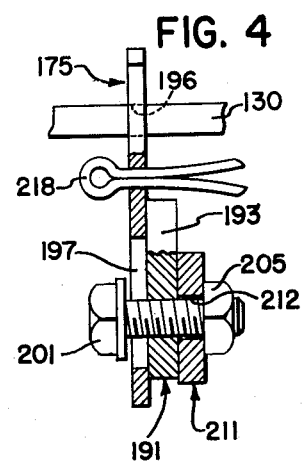
INVENTORS
WILLIAM P. OEHLER &
CHARLES H. YOUNGBERG
ATTORNEYS Patented Apr. 21, 1953

2,635,522

UNITED STATES PATENT OFFICE 2,635,522

DISK HARROW AND SCRAPER CONTROL MECHANISM

William P. Oehler and Charles H. Youngberg, Moline, Ill., assignors to Deere & Company, Moline, Ill., a corporation of Illinois Original application September 15, 1947, Serial No. 774,040. Divided and this application November 19, 1949, Serial No. 128,328

6 Claims. (Cl. 97—224)

This application is a division of our co-pending application, Serial No. 774,040, filed September 15, 1947.

The object and general nature of the present invention is the provision of a disk harrow having a new and improved control for the disk scrapers, wherein the scrapers may optionally be set for operating in a given position or be arranged for manual oscillation, as desired.

These and other objects and advantages of the present invention will be apparent to those skilled in the art after a consideration of the following detailed description, taken in conjunction with the accompanying drawings, in which Figure 1 is an enlarged perspective view of a portion of the disk gang of a disk harrow, in which the principles of the present invention have been incorporated, Figure 1 showing the preferred means for holding the scrapers in a generally fixed position of adjustment.

Figure 2 is a sectional view taken generally along the line 10—10 of Figure 1.

Figure 3 is an enlarged fragmentary perspective view, showing the scraper control means equipped optionally with a lever for changing the position of the scrapers, when desired.

Figure 4 is a sectional view taken generally along the line 12—12 of Figure 3.

In the disk harrow of the preferred construction, each of the front and rear gangs includes a plurality of disks 5 mounted in a gang frame or scraper-supporting frame 8, and each of the latter includes a bar 130 formed into generally rectangular configuration with rounded end portions 131. A reenforcing bar 132 connects the inner and outer ends of each frame and crossbars 133 connect the front and rear side sections of the frame. At the laterally outer end of each of the scraper frames 8, the adjacent crossbar 133 is welded to the upper end of a gang frame standard 137, and a similar standard is welded at its upper end to the inner end of the frame. The lower end of each standard 137 is connected with the draft structure for the harrow and is also connected with the associated bearing means in which the gang of disks is rotatably disposed.

As best shown in Figure 1, an oscillatable scraper shaft 170 is mounted for rocking movement on the rear portion of each of the gang frames 8. Each scraper shaft 170 preferably comprises a square member carrying a plurality of scraper blades 172, one for each disk. Each of the scraper blades 172 is mounted in a scraper blade clamp 173 which comprises a mating pair of scraper clamps 174, each having a blade-receiving section and a shaft-receiving section and firmly clamped to the companion member by a clamping bolt 175. Each of the scraper shafts is mounted in a pair of brackets 177 secured to the rear side of the gang frame by bolt means 178, each shaft 170 being supported in the bracket 177 by suitable bushings or the like. Each shaft 170 also carries a torsion spring 181 having one end 182 bearing against an adjacent portion of the frame and the other end 183 bearing against the adjacent scraper blade clamp 173, whereby the spring 181 serves not only to hold the scraper blades against the faces of the associated disks but also tends to rock the associated shaft 170 in such a direction as to carry the scraper blades radially inwardly of the disks.

Under some conditions it may be desirable to manually rock the scraper shafts 170 so as to shift the lower ends of the scraper blades 172 radially outwardly, but not beyond the edges of the associated disks, for the purpose of clearing away trash and the like, but under most conditions it is not necessary to oscillate the scraper shafts 170 although it is desirable to be able to dispose the lower ends of the scraper blades 172 in the desired position radially of the associated disks. In order to provide a new and improved scraper controlling linkage to accommodate the above mentioned two conditoins, we have provided the following scraper control means.

Referring first to Figure 1, one of the scraper blade clamping members, such as the one indicated by the reference numeral 174 in Figure 1, is provided with an upper or arm extension 191 that is provided with a tapped opening 192 and an abutment section 193. A member preferably in the form of a clip or plate 195 is provided with a relatively deep notch 196 dimensioned and angled so that the clip or plate 195 engages over the edge of the rear bar on the associated gang frame. The clip or plate 195 is also provided with a longitudinally extending slot 197. Where it is desired to be able to adjust the position of the scraper blades 172 radially of the disks, but not to oscillate the blades, we provide a bolt 201 and insert the same through the slot 197 and the bolt is screwed into the tapped opening 192 in the scraper arm 191. A washer 202 is placed underneath the head of the bolt 201 on the side of the clip or plate 195 opposite the arm 191. The scraper blades are then moved manually into the desired position while the bolt 201 is loose in the slot 197. Then the bolt 201 is tightened by turning the same farther into the arm 191, thus firmly and rigidly clamping the latter to the plate 195 and thereby holding the arm in a given position relative to the frame 8. A lock nut 205 is threaded onto the opposite end of the bolt 201 while retaining the desired adjustment. The scrapers may be readjusted at any time merely by loosening the lock nut 205 and then loosening the bolt 201 in the arm 191 to permit the bolt to be shifted to a new position in the slot 197, whereupon the clutch may then be tightened to retain the new adjustment. Thus, the plate 195 serves as stop means carried by the rear bar of the associated gang frame for preventing movement, when the bolt 201 and nut 205 are tightened, of the scraper blade shaft 170.

When it is desired to arrange the disk harrow for oscillating the scraper shafts 170 whenever desired, we supply an oscillating lever 210 for each shaft 170. As best shown in Figure 3, each lever 110 is provided at its lower end with a V-shaped notch 211 and an opening 212 to permit the lever to be mounted on the threaded end of the bolt 201. The upper end of each lever 210 has an opening 213 to receive a cable or other element 214 that may extend to the operator's position on the tractor. Where the levers 210 are to be used, and before mounting the levers on the bolts 201, each of the latter is loosened in its associated scraper arm 191 so that the bolt is freed for movement in the associated slot 197. Then with the bolt 201 in its loosened condition, the lever 210 is mounted, as shown in Figure 3, and then the lock nut 205 may be applied for firmly holding the lever 210 against the scraper arm 191. Arranged in this manner, with the springs 181 holding the scraper blades in their forward position, whenever it is desired to move the lower ends of the scraper blades rearwardly, all that the operator has to do is to pull on the cables 214. For the larger disks, the engagement of the abutment sections 193 on the arms 191 with the adjacent portion of the scraper frame serves to limit the outward movement of the lower ends of the scraper blades. However, where smaller disks may be used, we provide each of the clips or plates 195 with an opening 217 therein to receive a cotter 218, which is disposed rearwardly of the frame such a distance that when the lever 210 is pulled forwardly, the engagement of the lug 193 with its associated cotter serves to prevent the lower ends of the scraper blades from being swung outwardly beyond the edges of the associated disks.

While we have shown and described above the preferred structure in which the principles of the present invention have been incorporated, it is to be understood that our invention is not to be limited to the exact details shown and described herein, but that, in fact, widely different means may be employed in the practice of the broader aspects of our invention.

What we claim, therefore, and desire to secure by Letters Patent is:

1. In a disk harrow including a frame, a gang of disks journaled thereon and a scraper shaft rockably mounted on said frame, a lever for rocking said shaft, stop means carried by said frame and having spaced apart abutment portions, a part connected to move with said shaft and movable generally alongside said stop means, means carried by said part and engageable by said lever for detachably connecting the latter to said part in fixed relation thereto, whereby movement of said lever serves to rock said shaft, said means being engageable with the spaced apart abutment portions of said stop means for limiting the amount of rocking that can be imparted to said shaft by operation of said lever, and means carried by said part and adapted to engage said stop means, said last named part-carried means adapted, when tightened, to lock said part to said stop means, whereby said shaft is held against rocking movement.

2. In a disk harrow having a frame, a scraper shaft rockably mounted thereon, and scrapers carried by said shaft, an arm on said shaft, a slotted plate carried by said frame in a position transversely of said shaft and with the slotted portion thereof disposed alongside the path of movement of said arm when said shaft is rocked, and bolt means carried by said arm in transverse relation with respect to the latter and extending through the slot in said plate, said bolt means when tightened fixing said arm in different optional positions relative to said slot, the latter being longer than the diameter of said bolt means, whereby said arm is held against movement relative to said frame for holding said scrapers in different optional positions.

3. In a disk harrow having a frame, a scraper shaft rockably mounted thereon, and scrapers carried by said shaft, a slotted plate carried by said frame, an arm on said shaft, said arm having a tapped opening therein, a bolt having its threaded end extending through the slot in said plate and through the opening in said arm, said bolt when tightened serving to lock said arm to said plate and fix said arm against movement relative to said frame for positioning said scrapers, a lock nut on the threaded end of said bolt adapted when tightened against said arm to hold said bolt in its tightened position, said bolt, when loosened in said arm, being adapted to provide for movement of said arm relative to said frame to provide for movement of said scraper shaft and scrapers, and a lever having an opening adapted to receive the threaded end of said bolt and adapted to be mounted on the latter between said arm and lock nut, whereby when the latter is tightened against said lever movement of the latter shifts said scraper shaft and scrapers.

4. In a disk harrow having a frame, a scraper shaft rockably mounted thereon, and scrapers carried by said shaft, a slotted plate carried by said frame, an arm on said shaft, said arm having a tapped opening therein, a bolt having its threaded end extending through the slot in said plate and through the opening in said arm, said bolt when tightened serving to lock said arm to said plate and adapted when loosened to provide for movement of said scraper shaft and scrapers, within the limits defined by said slot, a scraper shifting lever having means to receive said bolt, and means including said bolt for fixing said lever to said arm, whereby shifting said lever acts through said arm to rock said scraper shaft, said slot serving to limit the rocking of said scraper shaft by said scraper shifting lever.

5. In a disk harrow including a frame, a gang of disks journaled thereon and a scraper shaft rockably mounted on said frame, an arm fixed to said shaft, a member adapted to be anchored to said frame and extending alongside said arm generally in the direction in which the portions of said arm adjacent said member move when said shaft is rocked, and connecting means engageable with said arm and member for securing them together in optionally different positions, said member having a notch engaged over a portion of said frame, and said connecting means including an elongated slot in said plate and securing means carried by said arm and extending through the slot in said plate for holding the scraper shaft against movement in either direction relative to said frame and in optionally different positions relative to said frame.

6. In a disk harrow including a frame, a gang of disks journaled thereon and a scraper shaft rockably mounted on said frame, an arm fixed to said shaft, a member adapted to be anchored to said frame and extending alongside said arm generally in the direction in which the portions of said arm adjacent said member move when said shaft is rocked, a scraper shifting lever, connecting means for detachably fixing said lever to said arm, and means on said member having a slot receiving said connecting means, said connecting means being engageable with the ends of said slot for limiting the movement imparted to said arm relative to said frame by said lever.

WILLIAM P. OEHLER.
CHARLES H. YOUNGBERG.

References Cited in the file of this patent

UNITED STATES PATENTS

| Number    | Name   | Date          |
|-----------|--------|---------------|
| 775,283   | Sobey  | Nov. 15, 1904 |
| 935,680   | Niesz  | Oct. 5, 1909  |
| 1,207,672 | Warne  | Dec. 5, 1916  |
| 1,289,989 | White  | Dec. 31, 1918 |
| 1,472,209 | Dewend | Oct. 30, 1923 |